A. GREVE.
SELF FEEDER FOR FEED CUTTERS.
APPLICATION FILED MAR. 25, 1909.
992,869.
Patented May 23, 1911.
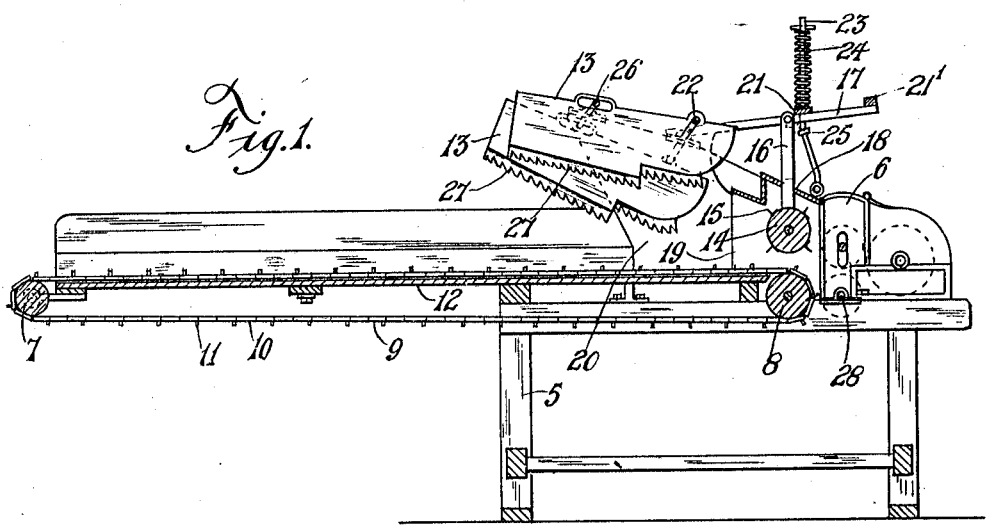
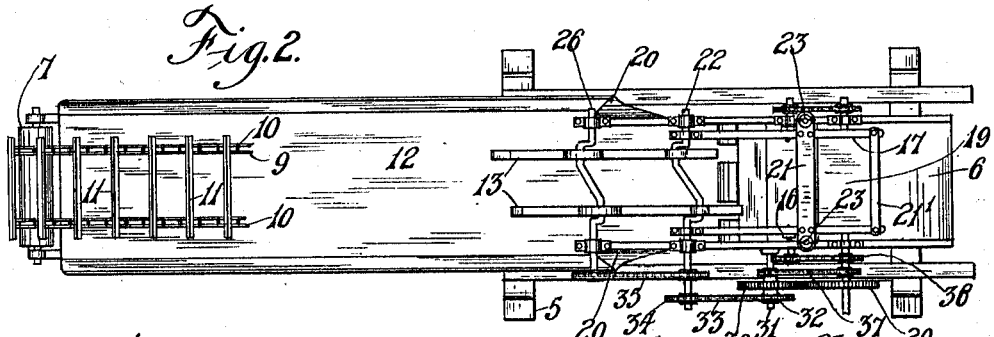
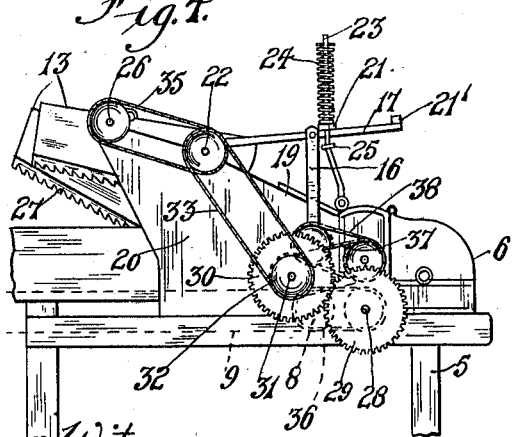
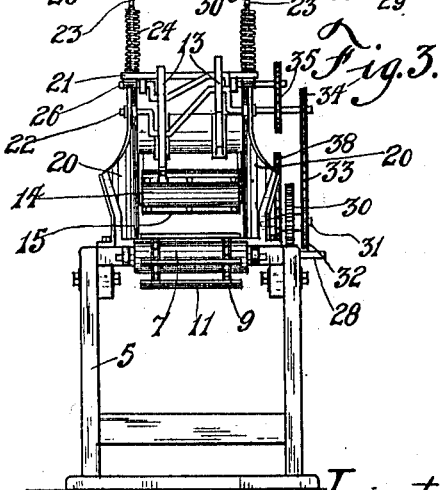
Witnesses.
A. Y. Andrews.
Anna F. Schmidtbauer
Inventor.
Andrew Greve
By Benedict, Morsell & Caldwell
Attorneys.

UNITED STATES PATENT OFFICE.

ANDREW GREVE, OF POTTER, WISCONSIN.

SELF-FEEDER FOR FEED-CUTTERS.

992,869.              Specification of Letters Patent.      Patented May 23, 1911.

Application filed March 25, 1909. Serial No. 485,847.

*To all whom it may concern:*

Be it known that I, ANDREW GREVE, residing in Potter, in the county of Calumet and State of Wisconsin, have invented new and useful Improvements in Self-Feeders for Feed-Cutters, of which the following is a description, reference being had to the accompanying drawings, which are a part of this specification.

This invention relates to improvements in self feeders for feed cutting machines whereby the danger to operators incident to feeding machines of this character is obviated.

One of the objects of this invention is to provide a feeder for feed cutting machines in which an endless belt is adapted to convey the material to the cutters from a point removed a safe distance therefrom so that the operator cannot accidentally get injured by having his hands caught between the cutters.

A further object of this invention is to provide a feeder for feed cutting machines in which the material is positively fed to the cutters and at the same time separated by oscillating means.

With the above, and other objects in view, the invention consists of the mechanism herein claimed and its parts and their combinations.

In the accompanying drawing, in which the same reference characters indicate the same parts in all of the views; Figure 1 is a longitudinal section view of the complete machine shown in connection with a feed cutting machine, the feed cutter being shown in dotted lines; Fig. 2 is a plan view of Fig. 1, part of the endless belt being omitted for clearness of illustration; Fig. 3 is a front end view of the machine; and, Fig. 4 is a side view of a portion of the machine showing means for driving the different parts.

Referring to the drawing, the numeral 5 indicates the frame of the machine and 6 the feed cutting machine mounted thereon. The feed cutting machine may be of any desirable kind or size.

Rollers 7 and 8 mounted in bearings on the frame are adapted to carry an endless feed belt 9 consisting of chain portions 10 connected together by cross slats 11. This belt rests upon a feed table or support 12 forming part of the main frame and upon which the material to be cut is placed. The endless belt and feed table extend forwardly from the cutters a sufficient distance to serve as a guard to prevent the operator in feeding material to the endless belt from coming in contact with the cutters. The material being carried on the feed belt is moved into the path of movement of oscillating members 13 which are adapted to grasp the material being fed to the feed cutter, separate it and draw it to a position so that it will pass beneath the yielding feed roller 14 positioned above the endless feed belt roller 8. The yielding roller 14 is provided with longitudinal blades or strips 15 which serve to assist in spreading the material over the width of the feed table and also limit the amount of material fed to the feed cutters. The yielding roller is suspended from links 16 which are pivotally connected to levers 17 and depend therefrom and pass through openings 18 provided in the casing 19. This casing covers the yielding roller and the inner feed belt roller and extends forward in the direction of the line of feed in the form of side guides 20 which are flared outwardly at their upper forward ends. The levers 17 which are connected together by cross connecting bars 21 and 21' are pivotally mounted on the straight portions of a double cranked shaft 22 mounted on the side guides 20 and are guided on guide rods 23 pivotally connected to the casing and extending upwardly therefrom and passing through openings in the cross bar 21. The upper ends of the guide rods are provided with transverse pins and coiled springs 24 surround the rods and are interposed between the transverse pins and the cross bar 21 so that the roller 14 is held yieldingly in position above the belt roller 8. Stops 25 on the said guide rods 23 limit the downward movement of the cross bar 21. A double cranked shaft 26 is also mounted on the side guides 20 and the oscillating members 13 are mounted on the cranked portions of the cranked shaft 22 and have a sliding connection with the cranked portions of the cranked shaft 26 so as to permit the reciprocation of the oscillating members thereon due to the greater length of the cranked portions of the shaft 22.

The direction of rotation of the crank shafts is such that the oscillating members move forwardly and upwardly during one half of the stroke and downwardly and rearwardly during the other half stroke or rotation of the cranked shafts so that the material fed by the endless belt will be grasped, separated and moved toward the feed cutting machine by the oscillation of these members. Each oscillating member is provided with a pair of serrated or toothed blades 27 connected thereto to better grasp the material fed to the machine. The mechanism described may be driven in any manner desired but is preferably driven by means of sprocket chains and gears as shown. In this manner of driving, the shaft 28 of the feed cutting machine may be considered as the main driving shaft from which the other parts derive their motion. A gear wheel 29 on the shaft 28 meshes with another gear 30 mounted on a stud shaft 31 projecting from the side of the casing 19, and a sprocket wheel 32 mounted on the stud shaft and connected to the gear 30 is connected to the cranked shaft 22 by means of a sprocket chain and wheel 33 and 34 respectively. The two cranked shafts are operatively connected together by means of a sprocket chain and wheels 35. Motion is transmitted to the endless belt and rollers by sprocket chain and wheels 36 from the main shaft. Motion is transmitted to the yielding roller by means of sprocket chains and wheels 37 and 38, one sprocket chain extending from a wheel (also connected to the gear 3) on the stud shaft to a wheel on the upper roller of the feed cutter, and the other sprocket chain extending from a wheel on the feed cutter shaft to a wheel on the yielding roller shaft.

In feeding this machine, the operator stands at the front or left hand end of the feed table and throws the material onto the endless belt and table and it is carried by the endless belt beneath the oscillating members which in turn assist to separate, spread and feed the material between the yielding feed roller and the endless belt. The yielding roller with its longitudinal blades tends to further spread the material and to limit the amount of material fed to the feed cutters to prevent choking and stopping the cutter. By the provision of the long table, endless belt and other parts the operator is relieved of the possibility of becoming injured by coming in contact with the cutters of the feed cutting machine.

From the foregoing description it will be seen that the feeder is very simple in construction and it accomplishes the results desired in an admirable manner.

What I claim as my invention is:

A feeder for feed cutting machines, comprising a feed table, means mounted on the table for moving material, cranked shafts mounted above the said table, the cranked portions of one of the shafts being greater than the cranked portions of the other shaft, and oscillating members pivotally connected to the cranked portion of the shaft of greater throw, said members provided with horizontal slots through which extend the cranked portions of the shaft of less throw, the said members also provided with serrated lower edges, portions of which are offset vertically from other portions.

In testimony whereof, I affix my signature, in presence of two witnesses.

ANDREW GREVE.

Witnesses:
CARL SCHAEFER, Jr.,
E. C. HINTZ.

---

Copies of this patent may be obtained for five cents each, by addressing the "Commissioner of Patents, Washington, D. C."